(12) United States Patent
Wang

(10) Patent No.: US 12,461,919 B2
(45) Date of Patent: Nov. 4, 2025

(54) SERVICE PROCESSING METHODS AND APPARATUSES

(71) Applicant: BOE Technology Group Co., Ltd., Beijing (CN)

(72) Inventor: Xin Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 10 days.

(21) Appl. No.: 18/294,137

(22) PCT Filed: Jan. 3, 2023

(86) PCT No.: PCT/CN2023/070211
§ 371 (c)(1),
(2) Date: Jan. 31, 2024

(87) PCT Pub. No.: WO2023/142911
PCT Pub. Date: Aug. 3, 2023

(65) Prior Publication Data
US 2024/0346026 A1    Oct. 17, 2024

(30) Foreign Application Priority Data
Jan. 26, 2022  (CN) .......................... 202210095995.9

(51) Int. Cl.
*G06F 16/2455*   (2019.01)
*G06F 16/242*    (2019.01)

(52) U.S. Cl.
CPC .... *G06F 16/24564* (2019.01); *G06F 16/2433* (2019.01)

(58) Field of Classification Search
CPC .......... G06F 16/24564; G06F 16/2433; G06F 16/00; G06F 16/245; G06F 8/36
(Continued)

(56) References Cited

U.S. PATENT DOCUMENTS

2007/0157167 A1 * 7/2007 Brendle .................... G06F 8/00
                                                            717/120
2009/0292677 A1 * 11/2009 Kim ....................... G06F 16/958
(Continued)

FOREIGN PATENT DOCUMENTS

| CN | 103095479 A | 5/2013 |
| CN | 107067244 A | 8/2017 |

(Continued)

OTHER PUBLICATIONS

PCT/CN2023/070211 international search report dated Apr. 2, 2023.
(Continued)

*Primary Examiner* — Apu M Mofiz
(74) *Attorney, Agent, or Firm* — IPro, PLLC

(57) ABSTRACT

The present disclosure provides a service processing method and apparatus. The method includes: obtaining a to-be-processed service request and determining a target rule identifier corresponding to the to-be-processed service request; determining a target service configuration rule corresponding to the target rule identifier; parsing the target service configuration rule to obtain target configuration information; based on the target configuration information, performing service processing. In this way, the demanding party is not required to develop relevant service function, greatly shortening the development cycle of the service function of the demanding party.

14 Claims, 5 Drawing Sheets

```
┌─ 101
Obtain a to-be-processed service request and determine a target rule
identifier corresponding to the to-be-processed service request ↓                ┌─ 102
Determine a target service configuration rule corresponding to the target rule
                          identifier ↓                ┌─ 103
Obtain target configuration information by parsing the target service
                       configuration rule ↓                ┌─ 104
Perform service processing based on the target configuration information
```

(58) Field of Classification Search
USPC .......................................................... 707/769
See application file for complete search history.

(56) References Cited

U.S. PATENT DOCUMENTS

| | | | |
|---|---|---|---|
| 2014/0244809 A1* | 8/2014 | Kang ................... | H04L 67/565 |
| | | | 709/220 |
| 2015/0088807 A1* | 3/2015 | Toppin ................. | G06F 16/254 |
| | | | 707/602 |
| 2018/0218044 A1* | 8/2018 | Wong ................... | G06F 16/2282 |
| 2020/0242534 A1* | 7/2020 | Klink ................ | G06Q 10/06395 |
| 2021/0295343 A1 | 9/2021 | Wang | |

FOREIGN PATENT DOCUMENTS

| | | |
|---|---|---|
| CN | 109445842 A | 3/2019 |
| CN | 112800120 A | 5/2021 |
| CN | 112905680 A | 6/2021 |
| CN | 113312113 A | 8/2021 |
| CN | 113377372 A | 9/2021 |
| CN | 114416075 A | 4/2022 |

OTHER PUBLICATIONS

PCT/CN2023/070211 Written Opinion dated Apr. 2, 2023.
CN 202210095995.9 first office action dated Mar. 1, 2025.

* cited by examiner

| Product type | Sales volume | Return volume |
|---|---|---|
| Mobile phones of model 1 | 2 | 1 |
| Mobile phones of model 2 | 10 | 0 |
| Mobile phones of model 3 | 5 | 1 |
| Computer of model 1 | 20 | 0 |
| Computer of model 1 | 30 | 5 |

SERVICE PROCESSING METHODS AND APPARATUSES

CROSS-REFERENCE TO RELATED APPLICATIONS

This application is a national stage of international PCT Application No. PCT/CN2023/070211 filed on Jan. 3, 2023, which claims priority to Chinese patent application No. 202210095995.9 filed on Jan. 26, 2022, the entire contents of which are incorporated herein by reference.

TECHNICAL FIELD

The present disclosure relates to the technical field of electronic devices and in particular to a service processing method and apparatus.

BACKGROUND

During use of systems and applications, a data statistics function (for example, performing statistics for a mobile phone sales volume within a specified time period), and a message notification function (for example, sending a verification code to a user via short message) and other service functions are usually involved.

At present, to achieve corresponding service function, a demanding party needs to write corresponding service codes and then perform service processing based on the service codes. For example, to achieve data statistics function, development personnel of the demanding party needs to write corresponding database codes and perform data statistics processing from a database based on the database codes.

However, when different demanding parties need to achieve a same service function, the development personnel of each demanding party needs to write corresponding service codes, lengthening the development cycle of the service function of the demanding parties.

SUMMARY

To overcome the problems in the related arts, the present disclosure provides a service processing method and apparatus.

According to a first aspect of embodiments of the present disclosure, there is provided a service processing method, which includes:
obtaining a to-be-processed service request and determining a target rule identifier corresponding to the to-be-processed service request;
determining a target service configuration rule corresponding to the target rule identifier;
obtaining target configuration information by parsing the target service configuration rule; and
performing service processing based on the target configuration information.

In some embodiments, determining the target service configuration rule corresponding to the target rule identifier includes:
determining a service encapsulation interface corresponding to the target rule identifier; where the service encapsulation interface indicates at least one service configuration rule; and
invoking the service encapsulation interface, and based on the at least one service configuration rule indicated by the service encapsulation interface, determining the target service configuration rule corresponding to the target rule identifier.

In some embodiments, performing the service processing based on the target configuration information includes:
determining target service codes based on the target configuration information, and performing corresponding service processing based on the target service codes.

In some embodiments, determining the target service codes based on the target configuration information includes:
by configuring preset code information based on the target configuration information, obtaining the target service codes.

In some embodiments, the target service configuration rule includes a data statistics rule; the target configuration information includes target statistics configuration information; and the code information includes a database statement format;
by configuring the preset code information based on the target configuration information, obtaining the target service codes includes;
based on the database statement format and the target statistics configuration information, generating a database query statement; and
performing corresponding service processing based on the target service codes includes:
executing the database query statement to perform corresponding data statistics processing so as to obtain target statistics data.

In some embodiments, the target statistics configuration information includes one or more of a target database identifier, a target datasheet identifier, a target to-be-calculated field name or a target query condition;
based on the database statement format and the target statistics configuration information, generating the database query statement includes:
by splicing one or more of the target database identifier, the target datasheet identifier, the target to-be-calculated field name or the target query condition based on the database statement format, generating the database query statement.

In some embodiments, executing the database query statement to perform corresponding data statistics processing so as to obtain the target statistics data includes:
executing the database query statement to query for a field value corresponding to a target to-be-calculated field based on a target query condition in the database query statement to obtain the target statistics data corresponding to a target data statistics rule; where the target to-be-calculated field is a field in a datasheet corresponding to a target datasheet identifier in a database corresponding to a target database identifier.

In some embodiments, the method further includes:
obtaining database connection information corresponding to the target database identifier; and
based on the database connection information corresponding to the target database identifier, connecting a database corresponding to the target database identifier.

In some embodiments, the method further includes:
sending the target statistics data to a target user end such that the target user end displays the target statistics data.

In some embodiments, the target service configuration rule includes a notification manner configuration rule: the target configuration information includes target notification manner configuration information; and the code information includes a notification manner invoking method;
   by configuring the preset code information based on the target configuration information, obtaining the target service codes includes:
   determining a target notification manner invoking method corresponding to the target notification manner configuration information; and
   obtaining an encapsulated target notification manner invoking method by encapsulating the target notification manner configuration information to the target notification manner invoking method;
   performing corresponding service processing based on the target service codes includes:
   invoking the encapsulated target notification manner invoking method so as to generate and send a notification message to a receiver based on a target notification manner.

In some embodiments, the target notification manner invoking method indicates codes for invoking a target interface corresponding to the target notification manner to generate and send the notification message;
   the target notification manner configuration information includes target sending information, where the target sending information includes target receiver information;
   invoking the encapsulated target notification manner invoking method so as to generate and send the notification message to the receiver based on the target notification manner includes:
   by the encapsulated target notification manner invoking method, invoking the target interface so as to generate a corresponding notification message based on the target sending information, and send the notification message to the receiver corresponding to the target receiver information based on the target notification manner; where the target interface includes an interface provided by a service provider corresponding to the target notification manner and/or an interface of a server corresponding to the target notification manner.

In some embodiments, the target sending information further includes target sender information: where the target sender information includes one or more of a sender name, a sender email, a sender password or a sender number;
   the target notification manner includes one or more of an email notification manner, a short message notification manner, or a specified application notification manner.

In some embodiments, the target notification manner configuration information includes a target notification manner identifier and/or a target message template identifier:
   determining the target notification manner invoking method corresponding to the target notification manner configuration information includes;
   determining the target notification manner invoking method corresponding to the target notification manner identifier and/or the target message template identifier.

In some embodiments, a first page is provided by an electronic device; and the first page includes a rule configuration control and a configuration completion control;
   the method further includes:
   in response to a first trigger operation for the configuration completion control, obtaining configuration information corresponding to the rule configuration control; and
   based on the configuration information corresponding to the rule configuration control, generating a service configuration rule and a rule identifier corresponding to the service configuration rule.

According to a second aspect of embodiments of the present disclosure, there is provided a service processing apparatus, which includes:
   an identifier determining module, configured to obtain a to-be-processed service request and determine a target rule identifier corresponding to the to-be-processed service request;
   a rule determining module, configured to determine a target service configuration rule corresponding to the target rule identifier;
   a rule processing module, configured to obtain target configuration information by parsing the target service configuration rule; and
   a service processing module, configured to perform service processing based on the target configuration information.

In some embodiments, the rule determining module is configured to:
   determine a service encapsulation interface corresponding to the target rule identifier; where the service encapsulation interface indicates at least one service configuration rule; and
   invoke the service encapsulation interface, and based on the at least one service configuration rule indicated by the service encapsulation interface, determine the target service configuration rule corresponding to the target rule identifier.

In some embodiments, the service processing module is configured to:
   determine target service codes based on the target configuration information, and perform corresponding service processing based on the target service codes.

In some embodiments, the service processing module is further configured to:
   by configuring preset code information based on the target configuration information, obtain the target service codes.

In some embodiments, the target service configuration rule includes a data statistics rule: the target configuration information includes target statistics configuration information; and the code information includes a database statement format:
   the service processing module is further configured to:
   based on the database statement format and the target statistics configuration information, generate a database query statement; and
   performing corresponding service processing based on the target service codes includes:
   executing the database query statement to perform corresponding data statistics processing so as to obtain target statistics data.

In some embodiments, the target statistics configuration information includes one or more of a target database identifier, a target datasheet identifier, a target to-be-calculated field name or a target query condition;
   the service processing module is further configured to:
   by splicing one or more of the target database identifier, the target datasheet identifier, the target to-be-calculated field name or the target query condition based on the database statement format, generate the database query statement.

In some embodiments, the service processing module is further configured to:
   execute the database query statement to query for a field value corresponding to a target to-be-calculated field based on a target query condition in the database query statement to obtain the target statistics data corresponding to a target data statistics rule; where the target to-be-calculated field is a field in a datasheet corresponding to a target datasheet identifier in a database corresponding to a target database identifier.

In some embodiments, the service processing module is further configured to:
obtain database connection information corresponding to the target database identifier; and
based on the database connection information corresponding to the target database identifier, connect a database corresponding to the target database identifier.

In some embodiments, the service processing module is further configured to:
send the target statistics data to a target user end such that the target user end displays the target statistics data.

In some embodiments, the target service configuration rule includes a notification manner configuration rule: the target configuration information includes target notification manner configuration information; and the code information includes a notification manner invoking method.

The service processing module is further configured to:
determine a target notification manner invoking method corresponding to the target notification manner configuration information; and
obtain an encapsulated target notification manner invoking method by encapsulating the target notification manner configuration information to the target notification manner invoking method.

The service processing module is further configured to:
invoke the encapsulated target notification manner invoking method so as to generate and send a notification message to a receiver based on a target notification manner.

In some embodiments, the target notification manner invoking method indicates codes for invoking a target interface corresponding to the target notification manner to generate and send the notification message;
the target notification manner configuration information includes target sending information, where the target sending information includes target receiver information; the service processing module is further configured to:
by the encapsulated target notification manner invoking method, invoke the target interface so as to generate a corresponding notification message based on the target sending information, and send the notification message to the receiver corresponding to the target receiver information based on the target notification manner; where the target interface includes an interface provided by a service provider corresponding to the target notification manner and/or an interface of a server corresponding to the target notification manner.

In some embodiments, the target sending information further includes target sender information: where the target sender information includes one or more of a sender name, a sender email, a sender password or a sender number;
the target notification manner includes one or more of an email notification manner, a short message notification manner, or a specified application notification manner.

In some embodiments, the target notification manner configuration information includes a target notification manner identifier and/or a target message template identifier:
the service processing module is further configured to:
determine the target notification manner invoking method corresponding to the target notification manner identifier and/or the target message template identifier.

In some embodiments, a first page is provided by an electronic device; and the first page includes a rule configuration control and a configuration completion control;
the service processing apparatus further includes a rule configuring module;
the rule configuring module is configured to:
in response to a first trigger operation for the configuration completion control, obtain configuration information corresponding to the rule configuration control; and
based on the configuration information corresponding to the rule configuration control, generate a service configuration rule and a rule identifier corresponding to the service configuration rule.

According to a third aspect of embodiments of the present disclosure, there is provided an electronic device, including:
a processor;
a memory storing processor executable instructions;
where the processor is configured to:
obtain a to-be-processed service request and determine a target rule identifier corresponding to the to-be-processed service request;
determine a target service configuration rule corresponding to the target rule identifier;
obtain target configuration information by parsing the target service configuration rule; and
perform service processing based on the target configuration information.

According to a fourth aspect of embodiments of the present disclosure, there is provided a computer readable storage medium storing computer executable instructions, where the computer executable instructions are executed by a processor to perform the service processing method as mentioned in the first aspect or various possible designs of the first aspect.

According to a fifth aspect of embodiments of the present disclosure, there is provided a computer program product, including a computer program, where the computer program is executed by a processor to perform the service processing method as mentioned in the first aspect or various possible designs of the first aspect.

The technical solutions provided by the embodiments of the present disclosure may include the following beneficial effects.

In the embodiments of the present disclosure, when a to-be-processed service request is obtained, which indicates that the demanding party needs to implement relevant service function, a target rule identifier corresponding to the to-be-processed service request is determined such that a service configuration rule corresponding to a service function to be implemented by the demanding party is determined based on the target rule identifier, that is, a target service configuration rule is determined. The target service configuration rule is parsed to obtain corresponding target configuration information, and then based on the target configuration information, relevant service processing is performed to achieve corresponding service function. In this case, the demanding party does not need to develop relevant service function but input a corresponding to-be-processed service request, which greatly shortens the development cycle of the service function of the demanding party. Further, the service function implemented can be used by multiple demanding parties, so as to achieve multiplexing of the service function and improve the service function multiplexing rate.

It should be understood that the above general descriptions and subsequent detailed descriptions are only illustrative and explanatory rather than limiting of the present disclosure.

BRIEF DESCRIPTION OF DRAWINGS

The drawings incorporated into the specification as a part of the specification illustrate embodiments consistent with the present disclosure and serve to explain the principle of the present disclosure together with the specification.

DETAILED DESCRIPTION

Figures 1, 2:
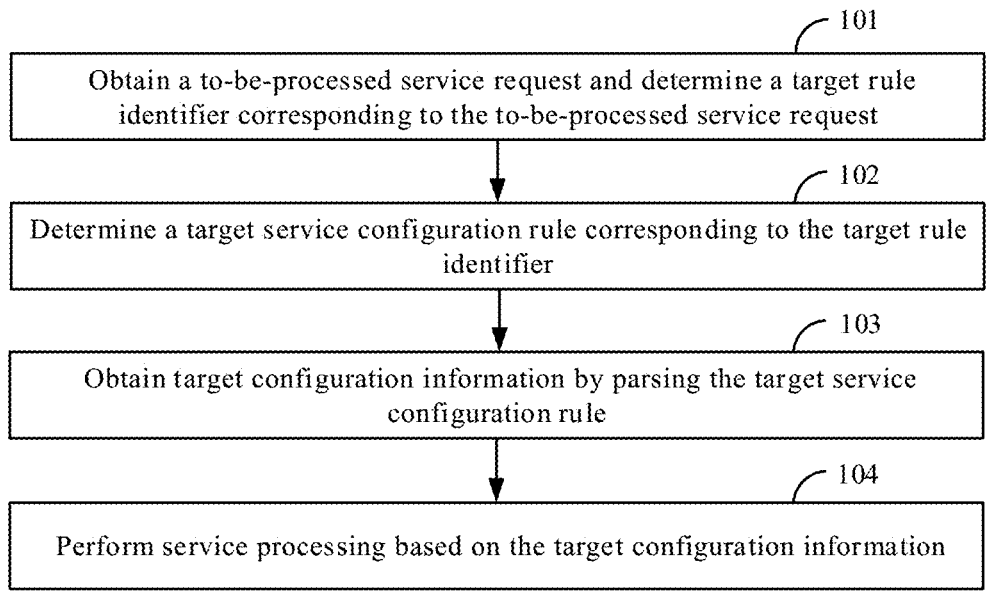
FIG. 1 is a flowchart illustrating a service processing method according to an exemplary embodiment of the present disclosure.
FIG. 2 is a schematic diagram illustrating a datasheet according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following embodiments do not represent all embodiments consistent with the present disclosure. Rather, they are merely examples of apparatus and method consistent with some aspects of the present disclosure as detailed in the appended claims.

The terms used in the present disclosure are for the purpose of describing particular embodiments only, and are not intended to limit the present disclosure. Terms determined by "a". "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first." "second." "third." or the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

The embodiments of the present disclosure will be further detailed below.

FIG. 1 is a flowchart illustrating a service processing method according to an exemplary embodiment of the present disclosure. The execution subject of the method is an electronic device. The method includes the following steps.

At step 101, a to-be-processed service request is obtained and a target rule identifier corresponding to the to-be-processed service request is determined.

In this embodiment, when a demanding party needs to perform relevant service processing to achieve corresponding service function, a corresponding to-be-processed service request is input at a corresponding user end. When the electronic device obtains the to-be-processed service request, a target rule identifier corresponding to the to-be-processed service request is determined such that the service function desired by the demanding party is achieved based on the target rule identifier.

The demanding party may be an A end user, or a B end user or a C end user.

The A end user is a service developer or a technical service provider, for example, project manager, product manager, or development personnel: the B end user is an enterprise user, i.e. personnel serving the C end, which corresponds to a merchant end; and the C end user is an individual user, i.e. consumer, which corresponds to a client.

The electronic device includes a service end in the A end and/or the B end (i.e. a server or a terminal used by development personnel). When the demanding party is the C end user, the C end user inputs a to-be-processed service request at the user end, and then the user end sends the to-be-processed service request to the electronic device such that the electronic device performs relevant processing based on the to-be-processed service request.

In some embodiments, the target rule identifier corresponding to the to-be-processed service request may be determined in the following two manners.

In one manner, the target rule identifier is obtained from the to-be-processed service request, namely, the to-be-processed service request directly includes the target rule identifier. After a rule identifier corresponding to a service configuration rule already configured is generated, the rule identifier is allocated to a demanding party. When the demanding party needs to achieve a service function, the demanding party may directly input the corresponding rule identifier, i.e. the target rule identifier, to generate a to-be-processed service request containing the target rule identifier.

In another manner, a rule identifier corresponding to a to-be-processed service request is determined from a preset request-identifier mapping table, and taken as the target rule identifier. When the demanding party needs to achieve a particular service function, a corresponding control is triggered to generate a to-be-processed service request, and then a rule identifier corresponding to the to-be-processed service request is queried for in a preset request-identifier mapping table. For example, when the demanding party needs to perform statistics for a sales volume of the mobile phones of model 1, a button for performing statistics for the sales volume of the mobile phones of model 1 displayed on a relevant page is clicked to generate a statistics request of the sales volume of the mobile phones, and a rule identifier corresponding to the statistics request of the sales volume of the mobile phones is queried for and determined as the target rule identifier.

At step 102, a target service configuration rule corresponding to the target rule identifier is determined.

At step 103, target configuration information is obtained by parsing the target service configuration rule.

In this embodiment, a service configuration rule corresponding to the target rule identifier is queried for and taken as the target service configuration rule. After the target service configuration rule is determined, the target service configuration rule is parsed to extract target configuration information in the target service configuration rule and thus relevant service processing can be performed automatically based on the target configuration information.

The service configuration rule is a service rule configured by the A end user (e.g. product manager) or the B end user based on the service function, i.e. the service requirement.

In some embodiments, the target service configuration rule includes a data statistics rule and/or a notification manner configuration rule. Correspondingly, the target configuration information includes target statistics configuration information and/or target notification manner configuration information. Of course, the target service configuration rule may further include a service rule for achieving another service function, i.e. another type of service rule. Correspondingly, the target configuration information may further include configuration information corresponding to another type of service rule. No limitation is made herein.

In some embodiments, the target statistics configuration information includes one or more of a target database identifier, a target datasheet identifier, a target to-be-calculated field name or a target query condition.

The target database identifier indicates an identifier of a database where to-be-calculated data is located at the time of performing data statistics processing. The target database identifier may be information used to uniquely represent a database, such as name, serial number or the like of the database.

The target datasheet identifier indicates an identifier of a datasheet where to-be-calculated data is located at the time of performing data statistics processing. The target datasheet identifier may be information used to uniquely represent a datasheet, such as name, serial number or the like of the datasheet. For example, the datasheet shown in FIG. 2 is a product sheet, which corresponds to a datasheet identifier Product.

The target to-be-calculated field name indicates a field name corresponding to to-be-calculated data at the time of performing data statistics processing. For example, when a sales volume of the mobile phones of model 1 is to be calculated, the to-be-calculated field includes the field name corresponding to the product type (e.g. the sales volume field shown in FIG. 2).

The target query condition indicates relevant information of condition query to be involved at the time of performing data statistics processing. The target query condition includes a condition field and a corresponding threshold. For example, when the sales volume of the mobile phones of model 1 is to be calculated, the condition field is a field name corresponding to the product type (e.g. the product type field shown in FIG. 2) and a corresponding threshold (i.e. the mobile phones of model 1).

In some embodiments, the target notification manner configuration information includes one or more of a target notification manner identifier, a target message template identifier, a target third-party service identifier or target sending information.

The target notification manner indicates a manner of pushing a message, and the target notification manner includes one or more of an email notification manner, a short message notification manner, or a specified application notification manner.

The target notification manner identifier indicates an identifier of a target notification manner, by which a corresponding notification manner may be determined. The target notification manner identifier may be information used to uniquely represent a notification manner, such as name, serial number or the like of the notification manner. For example, the identifier of the email notification manner is 1 and the identifier of the short message notification manner is 2.

When a message is pushed based on the target notification manner, a third-party service interface such as an API (application programming interface) of the service provider or a custom server interface or the like may be invoked so as to push the message via a third-party service. Correspondingly, the target notification manner configuration information may further include a third-party service identifier.

In some embodiments, when there are a plurality of third-party service interfaces corresponding to the target notification manner, the A end user and/or B end user may select a third-party service identifier and hence based on the selected third-party service identifier, i.e. the target third-party service identifier, determine a third-party service for pushing the message. For example, when a message is pushed by email, an email box service provider, i.e. an email service provider, may be selected, and the identifier of the selected email service provider is taken as the target third-party service identifier.

The target sending information includes target receiver information and/or target sender information. The target receiver information indicates relevant information of a user receiving a notification message, for example, a user end identifier, a user number, a user email or the like corresponding to the receiver. The target sender information includes one or more of a sender name, a sender email, a sender password or a sender number.

At step 104, service processing is performed based on the target configuration information.

In this embodiment, after the target configuration information is obtained, relevant service processing is automatically performed based on the target configuration information so as to achieve corresponding service function. Thus, the demanding party is not required to develop corresponding service function but in a case of needing to implement a service function, simply inputs a corresponding to-be-processed service request, reducing the workload of the demanding party.

It can be known from the above descriptions that, when a to-be-processed service request is obtained, which indicates that the demanding party needs to implement relevant service function, a target rule identifier corresponding to the to-be-processed service request is determined such that a service configuration rule corresponding to the service function to be implemented by the demanding party is determined based on the target rule identifier, that is, a target service configuration rule is determined. The target service configuration rule is parsed to obtain corresponding target configuration information, and then based on the target configuration information, relevant service processing is performed to achieve corresponding service function. In this case, the demanding party does not need to develop relevant service function but input a corresponding to-be-processed service request, which greatly shortens the development cycle of the service function of the demanding party. In this way, the service configuration rule is multiplexed, that is, the service function can be multiplexed once developed. Thus, the service function developed can be used by multiple demanding parties, so as to improve the service function multiplexing rate.

Figure 3:
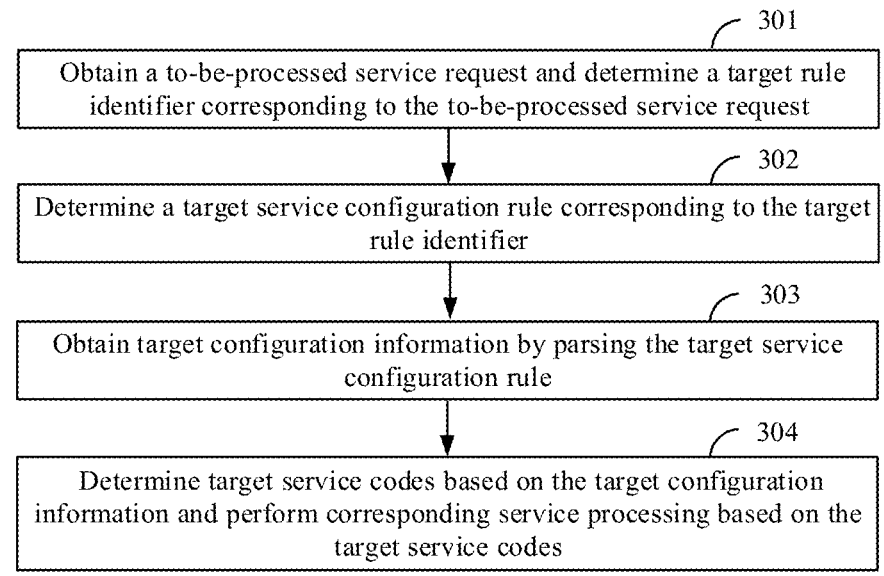
FIG. 3 is a flowchart illustrating another service processing method according to an exemplary embodiment of the present disclosure.

FIG. 3 is a flowchart illustrating another service processing method according to an exemplary embodiment of the present disclosure. In this embodiment, based on the above embodiment, how to automatically perform corresponding service processing based on the determined target configuration information is described. The method includes the following steps.

At step 301, a to-be-processed service request is obtained and a target rule identifier corresponding to the to-be-processed service request is determined.

In this embodiment, relevant personnel may configure a corresponding service configuration rule by using a page provided by an electronic device, i.e. a first page provided by the electronic device. The first page includes a rule configuration control and a configuration completion control. In response to a first trigger operation for the configuration completion control, configuration information corresponding to the rule configuration control is obtained. Based on the configuration information corresponding to the rule configuration control, a service configuration rule and a rule identifier corresponding to the service configuration rule are generated.

In some embodiments, relevant personnel may input or select corresponding configuration information in the rule configuration control displayed on the page. When the configuration is completed, relevant personnel may trigger the configuration completion control, and the electronic device may, after detecting a first trigger operation for the configuration completion control, obtain the configuration information corresponding to the rule configuration control, namely, the information input or selected by relevant personnel in the rule configuration control, and generate a service configuration rule containing the configuration information corresponding to the rule configuration control, and further allocate a rule identifier to the service configuration rule such that the service configuration rule can be queried for based on the rule identifier.

The relevant personnel include the A end user (for example, product manager, project manager, or the like) and/or the B end user.

The first trigger operation may include a click operation. The rule identifier may be a name, serial number or the like of a service configuration rule. The rule configuration control includes a control such as a drop-down box, a button, a radio box, a check box, a text box or the like.

In some embodiments, there may be at least one first page, namely, one first page may display all rule configuration controls or multiple first pages display the rule configuration controls.

In some embodiments, when the service configuration rule configured by relevant personnel is a data statistics rule, the configuration information corresponding to the rule configuration control includes one or more of a database identifier, a datasheet identifier, a to-be-calculated field name or a query condition.

Figure 4:
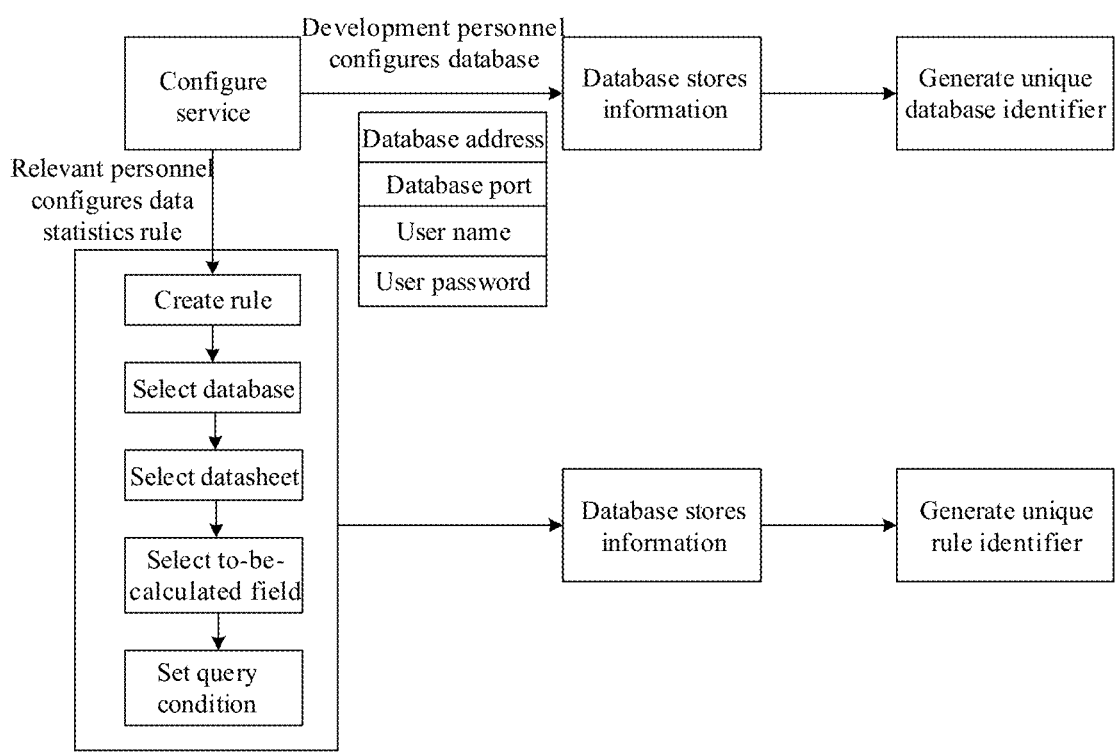
FIG. 4 is a schematic diagram of configuring a data statistics rule according to an exemplary embodiment of the present disclosure.

In some embodiments, as shown in FIG. 4, when the data statistics rule is configured, the first page displays a plurality of data source identifiers, i.e. database identifiers, and relevant personnel may select a desired database identifier. After the database identifier is selected, all datasheets in the database corresponding to the database identifier are displayed for relevant personnel to perform datasheet selection. After relevant personnel selects a datasheet to be calculated (i.e. a datasheet identifier), the field names in the selected datasheet are loaded for relevant personnel to select a field to be calculated (i.e. a to-be-calculated field name) and a condition field, and input or select a threshold (i.e. a query condition) corresponding to the condition field. After the configuration is completed, based on the information selected or input by relevant personnel, i.e. the configuration information (e.g. the database identifier selected by relevant personnel), a data statistics rule containing the configuration information is generated and a corresponding rule identifier is allocated to the data statistics rule.

When the data statistics function to be implemented only involves a single datasheet, only the desired single datasheet is selected. When the data statistics function to be implemented involves multiple datasheets, which indicates that it is required to perform associated-sheet query, relevant personnel may, after selecting one datasheet, continue selecting a next datasheet to be associated. There is an associated field between the associated datasheets, and correspondingly, the configuration information includes multiple datasheet identifiers.

When the data statistics function to be implemented only involves a single field to be calculated, only one data statistics rule may be configured, and the rule identifier corresponds to one data statistics rule. When the data statistics function to be implemented involves multiple fields to be calculated, it is required to configure multiple data statistics rules, and the rule identifier actually corresponds to a set of data statistics rules, that is, one rule identifier corresponds to multiple data statistics rules. For example, when the data statistics function to be implemented is calculating a sales volume of the mobile phones within a specified time period, only one data statistics rule may be configured. For another example, when the data statistics function to be implemented is calculating a sales volume of mobile phones and a sales volume of computers within a specified time period, it is required to configure two data statistics rules, one of which is used to calculate the sales volume of mobile phones within the specified time period and the other is used to calculate the sales volume of computers within the specified time period.

In some embodiments, as shown in FIG. 4, the configuration process of the above data statistics rule may be provided by a configuration service provided by the electronic device, namely, relevant personnel performs configuration on the first page provided by the configuration service and the configuration service stores the configuration information in a database and generates a corresponding rule identifier.

In some embodiments, when the service configuration rule configured by relevant personnel is a notification manner configuration rule, the configuration information corresponding to the notification manner configuration rule includes one or more of a notification manner identifier, a third-party service identifier, a message template identifier or sending information.

The sending information includes receiver information and sender information.

The message template identifier indicates a type of a pushed message, which includes a verification code template identifier, an alarm template identifier or the like.

In some embodiments, when relevant personnel configures the notification manner configuration rule, at least one notification manner is displayed on the first page, i.e. the identifier corresponding to the notification manner. Relevant personnel selects a desired notification manner identifier and continues selecting an already-integrated third-party service (e.g. a service provider identifier), i.e. the third-party service identifier. After the notification manner is selected, a message type (e.g. a verification code type or alarm type), i.e. a message template identifier, may be selected. After the message type is selected, user configuration of the receiver and sender is continued, namely, the user information of the receiver and the sender is input. After the configuration is completed, based on the information selected or input by relevant personnel, i.e. the configuration information (e.g. the notification manner identifier selected by relevant personnel), a notification manner configuration rule containing the configuration information is generated and a corresponding rule identifier is allocated to the notification manner configuration rule. Thus, based on the rule identifier, the notification manner configuration rule can be queried for so as to determine detailed configuration contents configured for the notification manner.

In some embodiments, when relevant personnel selects a third-party service of email and there is no desired service provider or relevant server in the inheriting third-party service, the relevant personnel may configure a custom email server, i.e. an interface of the custom server, namely, relevant configuration information of an API interface of the third-party service, for example, an address, parameter information (e.g. input parameter of the interface) or the like of the API interface of the custom third-party service.

The address of the API interface of the custom third-party service may be a network address, for example, an Internet Protocol (IP) address or a Uniform Resource Locator (URL) address.

Figure 5:
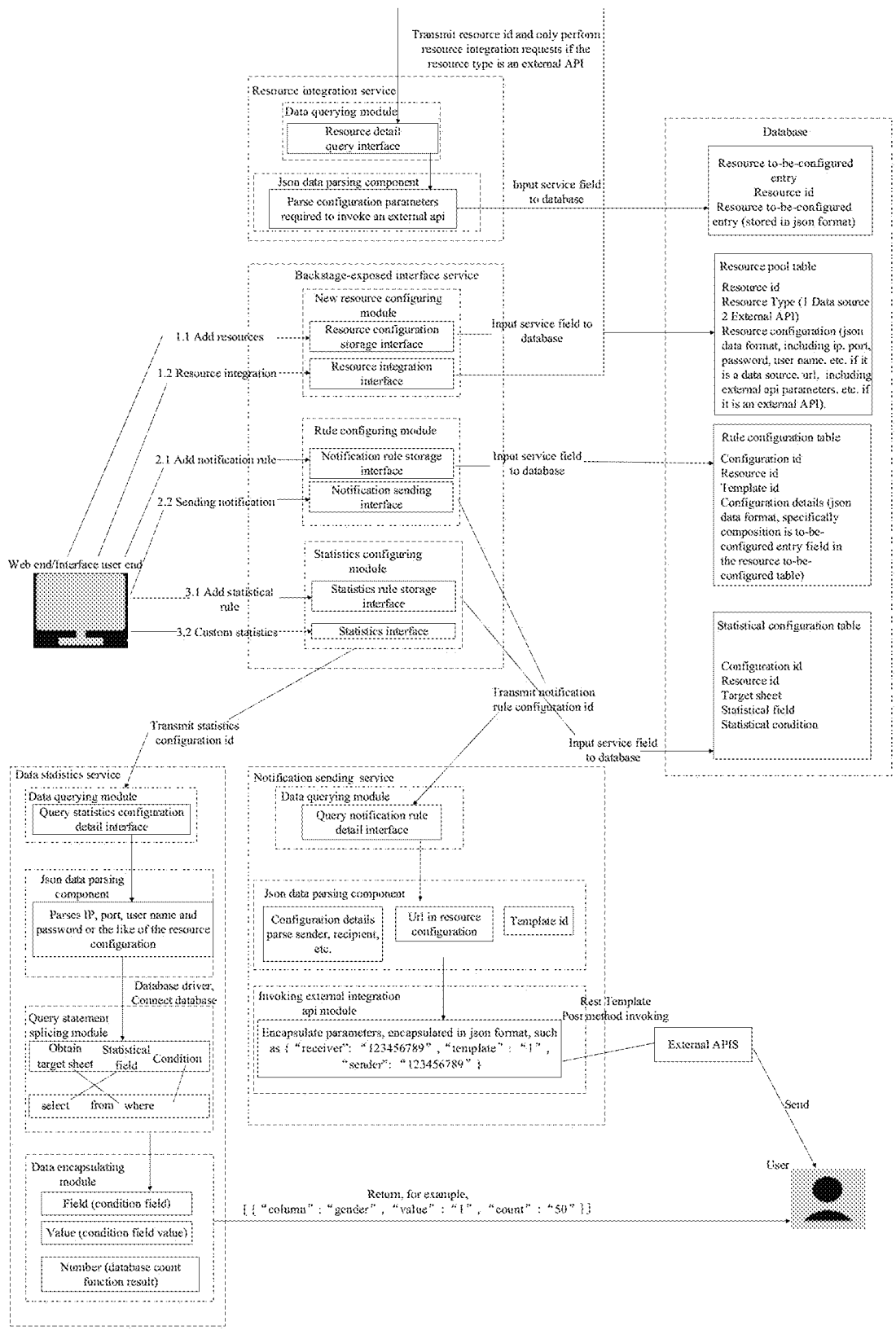
FIG. 5 is a schematic diagram illustrating architecture of a service processing system according to an exemplary embodiment of the present disclosure.

In some embodiments, as shown in FIG. 5, after obtaining an API interface of a new custom third-party service, i.e. additional new resource, the electronic device invokes a resource configuration storage interface to store relevant configuration information of the API interface of the custom third-party service (e.g. the URL, parameter or the like of the API interface of the custom third-party service) into a resource pool table, where the resource id indicates a third-party service identifier, the resource type is 1 data source, the resource configuration indicates connection information corresponding to a database, and the resource configuration indicates relevant configuration information of the API interface of the custom third-party service, i.e. of an external API interface.

In some embodiments, as shown in FIG. 5, relevant personnel may further edit (e.g. add, delete, modify), by using a Web end, the API interface of the third-party service provider. For example, after obtaining an API interface of a new third-party service provider, i.e. additional new resource, the electronic device may store relevant configuration information of the API interface of the third-party service provider into a resource pool table by using the resource configuration storage interface.

In some embodiments, to increase management efficiency of the API interface of the custom third-party service and the API interface of the third-party service of the third-party service provider or the like, independent management may be performed on relevant configuration information of the API interface by using resource integration service. In some embodiments, after obtaining a resource integration request, the electronic device may extract a resource id from the resource integration request. When the resourced id is a third-party service identifier or an external API interface, a resource integration interface is invoked to take the resource id as an input parameter of a resource query interface in a data querying module. Thus, relevant configuration information of the API interface of the third-party service corresponding to the resource id is obtained from the resource pool table via the resource query interface. Since the relevant configuration information is in the format of JSON, the relevant configuration information may be parsed by using a json data parsing component, and the parsed relevant configuration information is stored into a resource to-be-configured entry table in the database, such that the relevant configuration information of the API interface of the third-party service can be managed separately by using the resource to-be-configured entry table.

Figure 6:
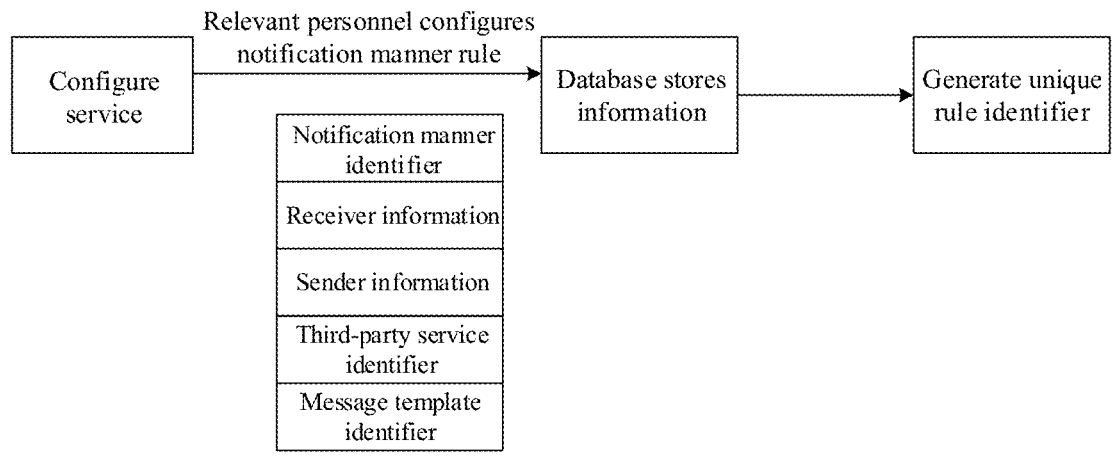
FIG. 6 is a schematic diagram of configuring a notification manner rule according to an exemplary embodiment of the present disclosure.

In some embodiments, as shown in FIG. 6, the configuration process of the above notification manner configuration rule may be provided by a configuration service provided by the electronic device, namely, relevant personnel performs configuration on the first page provided by the configuration service and the configuration service stores the configuration information in a database and generates a corresponding rule identifier.

For example, in a specific application scenario, as shown in FIG. 5, after obtaining the data statistics rule configured by relevant personnel, i.e. additional new statistics rule, the electronic device invokes a statistics rule storage interface in a statistics configuring module to generate a corresponding statistics configuration table by corresponding configuration service, i.e. based on the configuration information corresponding to the data statistics rule, and store the statistics configuration table into the database. The configuration id in the statistics configuration table indicates a rule identifier, the resource id indicates a third-party service identifier, the template id indicates a message template identifier, the statistics field is a to-be-calculated field name, and the statistics condition indicates a query condition. After obtaining the notification manner configuration rule configured by relevant personnel, that is, when obtaining an additional new notification rule, the electronic device invokes a notification rule storage interface in the rule configuring module to generate a corresponding rule configuration table by corresponding configuration service, i.e. based on the configuration information corresponding to the notification manner configuration rule, and store the rule configuration table into the database. The configuration id in the rule configuration table indicates a rule identifier, the resource id indicates a database identifier, the target sheet indicates a datasheet identifier, the statistics field is a to-be-calculated field name, and the configuration information indicates other relevant configuration information, for example, sending information.

At step 302, a target service configuration rule corresponding to the target rule identifier is determined.

In this embodiment, a service encapsulation interface corresponding to the target rule identifier is determined. The service encapsulation interface indicates at least one service configuration rule. The service encapsulation interface may be invoked such that a target service configuration rule corresponding to the target rule identifier is determined based on the at least one service configuration rule indicated by the service encapsulation interface.

In this embodiment, the development personnel of the A end may encapsulate the service rules configured by the A end user (e.g. a project manager at the A end), i.e. the service configuration rules, into a uniform interface to obtain a service encapsulation interface (a statistics interface or a notification sending interface shown in FIG. 6). When the development personnel of the B end needs to implement relevant service function, it is only required to invoke the service encapsulation interface to use pre-configured service configuration rules without developing the corresponding service function again. Of course, the development personnel of the A end may further encapsulate other functions (e.g. adding a data source, or adding the API interface of the third-party service or the like) into a corresponding service interface to be invoked by the development personnel of the B end, and therefore, the development personnel of the B end or the users of the B end (e.g. a project manager of the B end) can perform corresponding operations.

In some embodiments, when the service encapsulation interface is obtained by encapsulation, if the A end user inputs a corresponding to-be-processed service request, the electronic device (i.e. a service end in the A end) may determine a target rule identifier based directly on the to-be-processed service request, and perform relevant service processing based on the target rule identifier. Of course, the electronic device may further invoke the service encapsulation interface to perform relevant service processing. Similarly an interface relating to the service configuration rule (e.g. a statistics rule storage interface) is obtained by encapsulation, if the A end user needs to edit the service configuration rule (e.g. adding a service configuration rule), the electronic device (i.e. the service end in the A end) may directly perform corresponding processing on the edited service configuration rule (e.g. storing into the database). Of course, relevant processing may be performed by invoking a corresponding interface. No limitation is made herein.

In some embodiments, in a case that a to-be-processed service request is input by the B end user or the C end user, since the B end directly interacts with the C end, the electronic device serves as the service end in the B end. The electronic device invokes the service encapsulation interface for the target rule identifier corresponding to the to-be-processed service request such that a service configuration rule corresponding to the target rule identifier is queried for by using the service encapsulation interface, and taken as the target service configuration rule. Thus, corresponding service processing can be performed based on the target service configuration rule so as to achieve relevant service function, without requiring the development personnel of the B end to re-write relevant codes, reducing the workload of the development personnel of the B end.

The service encapsulation interface corresponding to the target rule identifier indicates an interface encapsulating the service configuration rule corresponding to the target rule identifier.

In some embodiments, when the service configuration rule corresponding to the target rule identifier is queried for by using the service encapsulation interface, the determination may be performed by using corresponding configuration service, namely, the target rule identifier is conveyed to the configuration service (e.g. a data statistics service and a notification sending service) by the service encapsulation interface, such that the configuration service determines the service configuration rule corresponding to the target rule identifier.

In some embodiments, the B end user or the development personnel of the B end may further, based on requirements, edit service configuration rule, database, API interface of a third-party service or the like in a custom way. Thus, the development personnel of the B end does not need to develop relevant codes but invoke the corresponding interface provided by the A end, reducing the workload of the development personnel of the B end and improving the user experiences.

In this embodiment, the service configuration rule configured by the A end user is encapsulated to obtain a service encapsulation interface and the development personnel of the B end accesses the service encapsulation interface to use the encapsulated service configuration rule corresponding to the service encapsulation interface. Thus, the development personnel of the B end does not need to develop corresponding service function but invoke the service encapsulation interface, reducing the development cycle of the service function.

In this embodiment, when a service requirement (e.g. a query condition) is changed, the corresponding service configuration rule is dynamically modified, that is, a to-be-updated rule identifier and corresponding latest configuration information are obtained (e.g. the query condition is modified), and based on the latest configuration information, the service configuration rule corresponding to the to-be-updated rule identifier is updated so as to achieve dynamic configuration for the service configuration rule and thus update the service function, without requiring the development personnel to re-write relevant codes to update the corresponding service function, greatly reducing the labor investment resulting from the requirement change.

In this embodiment, the service configuration rule may be rules of different types or dimensions, that is, different service function can be achieved. When different service functions are to be achieved, the achievement can be implemented by switching, i.e. using different types of service configuration rules (e.g. data statistics rules).

At step 303, target configuration information is obtained by parsing the target service configuration rule.

In this embodiment, the target service configuration rule may be in the format of JSON and accordingly, the target service configuration rule is parsed by using the JSON data parsing component to extract valid configuration information so as to obtain the target configuration information.

At step 304, target service codes are determined based on the target configuration information and corresponding service processing is performed based on the target service codes.

In this embodiment, after the target configuration information in the target service configuration rule is obtained, the target service codes corresponding to relevant service function are determined automatically based on the target configuration information. The target service codes are used to achieve corresponding service function. Thus, the service codes can be automatically determined without requiring the demanding party to write the target service codes, reducing the workload of the development personnel of the demanding party.

In this embodiment, after the target service codes are obtained, the target service codes are executed to perform corresponding service processing. In this way, the demanding party can complete corresponding service processing by simply knowing the rule identifier corresponding to the desired service function so as to achieve corresponding service function, without requiring the demanding party to perform code development for the service function, greatly reducing the labor investment.

In some embodiments, when the target service codes are determined based on the target configuration information, preset code information is configured based on the target configuration information to obtain the target service codes.

In some embodiments, the code information includes a database statement format and/or a notification manner invoking method. The target notification manner invoking method indicates codes for invoking a target interface corresponding to a target notification manner to generate and send a notification message.

The target notification manner invoking method is codes written for invoking a target interface after the development personnel corresponding to the configuration service learns the use method (e.g. how to apply for a template or signature) of the target interface (e.g. the API interface of an email service provider).

In some embodiments, when the service function is a data statistics function, that is, when the target service configuration rule is a data statistics rule, a corresponding database query statement is automatically generated based on the target statistics configuration information. That is, based on the database statement format, one or more of a target database identifier, a target datasheet identifier, a target to-be-calculated field name, or a target query condition are spliced to generate a corresponding database query statement. For example, a target database statement format is: select to-be-calculated field from datasheet identifier where query condition.

Correspondingly, when the data statistics processing is performed, the database query statement is executed to perform corresponding data statistics processing so as to obtain target statistics data, thus achieving corresponding data statistics function.

In some embodiments, when the database query statement is executed to perform corresponding data statistics processing, the database query statement is executed such that a field value corresponding to a target to-be-calculated field is queried for based on the target query condition in the database query statement to obtain the target statistics data corresponding to the target data statistics rule. For example, the service function to be implemented is to calculate the sales volume of the mobile phones of model 1. As shown in FIG. 2, by querying a product table, the sales volume of the mobile phones of model 1 is determined as 2.

In some embodiments, after the desired target statistics data is obtained, the target statistics data is sent to a target user end such that the target user end (e.g. the user end corresponding to the B end user, or the user end corresponding to the C end user) displays the target statistics data.

In some embodiments, when a rule identifier corresponds to a plurality of data statistics rules, which indicates the plurality of data statistics rules are to be executed, target statistics data corresponding to each data statistics rule is determined, and the target statistics data corresponding to all the data statistics rules are encapsulated into one object and the object is then sent to the target user end.

For example, when the demanding party needs to determine a sales volume of mobile phones and a return volume of mobile phones within a specified time period, there may be two data statistics rules corresponding to the rule identifier: one is used to calculate the sales volume of the mobile phones of model 1, and the other is used to calculate the return volume of the mobile phones of model 1. The configuration service determines the return volume and the sales volume of the mobile phones of model 1 based on the two data statistics rules and encapsulates the return volume and the sales volume into one object, and then sends the object to the demanding party such that the demanding party, based on the return volume and the sales volume, generates a pie chart for displaying the return and sales volumes of the mobile phones.

For example, in a specific application scenario, as shown in FIG. 5, when the service configuration rule is a data statistics rule, the service encapsulation interface is a statistics interface in the statistics configuring module in the backstage-exposed interface service, and is obtained by encapsulating the data statistics service. The data statistics service includes a data querying module, a json data parsing component, a query statement splicing module and a data encapsulating module. After the electronic device (e.g. the development end corresponding to the B end) obtains the target rule identifier, when the target rule identifier is a rule identifier corresponding to the data statistics rule, the electronic device invokes the statistics interface such that the target rule identifier is taken as input parameter of a query statistics configuration detail interface in the data querying module based on the statistics interface so as to query for a statistics configuration table, i.e. a data statistics rule, corresponding to the target rule identifier in the database by using the query statistics configuration detail interface, where the data statistics rule is in the format of json. The json data parsing component parses the data statistics rule to obtain the statistics configuration information, and the query statement splicing module splices the statistics configuration information to obtain a corresponding database query statement, and then, based on the database query statement, corresponding data statistics processing is performed to obtain statistics data. The data encapsulating module encapsulates the statistics data based on a preset encapsulation format and sends the encapsulated statistics data to the target user end. For example, the encapsulated statistics data is: "column": "gender", "value": "1", "count": "50". i.e. the calculated number of the males: where column is a condition field, value is a threshold corresponding to the condition field, count is a query result of a count function, i.e. a result obtained by executing the database query statement.

In some embodiments, because a database is to be firstly connected before data in the database is used, it is required to obtain database connection information corresponding to the target database identifier. Based on the database connection information corresponding to the target database identifier, a database corresponding to the target database identifier is connected.

The database connection information includes one or more of a database address, a database port, a user name, or a user password. The database address may be a network address, for example, an IP address.

In some embodiments, the database connection information may be pre-configured by development personnel, namely, development personnel performs database configuration in advance to configure corresponding connection information for a database. As shown in FIG. 4, after the electronic device receives the connection information corresponding to the database configuration, the electronic device generates a database identifier for the connection information corresponding to the database and thus corresponding connection information can be queried for based on the database identifier so as to connect the corresponding database successfully based on the connection information.

As shown in FIG. 4, after the connection information corresponding to the database is obtained, the connection information may be stored into a corresponding database.

In some embodiments, as shown in FIG. 5, after obtaining the connection information corresponding to the database, that is, obtaining additional new resource, the electronic device may invoke the resource configuration storage interface to store the connection information corresponding to the database into the resource pool table. The resource id indicates a database identifier, the resource type is 1 data source, and the resource configuration indicates connection information corresponding to the database.

In some embodiments, relevant personnel may further edit the database identifier, namely, perform operations such as add, delete or the like on the displayed database identifier.

In some embodiments, when the service function to be implemented is a notification sending function, that is, when the target service configuration rule is the data statistics rule, the specific process of configuring preset code information based on the target configuration information to obtain the target service codes is as follows:

determining a target notification manner invoking method corresponding to the target notification manner configuration information; and encapsulating the target notification manner configuration information to the target notification manner invoking method to obtain an encapsulated target notification manner invoking method.

Correspondingly, performing corresponding service processing based on the target service codes includes:

invoking the encapsulated target notification manner invoking method so as to generate and send a notification message to a receiver based on a target notification manner.

In some embodiments, the desired target notification manner invoking method is determined based on the target notification manner configuration information, and the target notification manner configuration information is taken as input parameter of the target notification manner invoking method, such that the target notification manner configuration information is conveyed, i.e., encapsulated to the target notification manner invoking method. After the target notification manner configuration information is conveyed to the target notification manner invoking method, the target notification manner invoking method is executed such that a notification message is generated based on the target notification manner configuration information and pushed to the receiver based on the target notification manner, thereby pushing the message in the target notification manner.

In some embodiments, invoking the encapsulated target notification manner invoking method so as to generate and send the notification message to the receiver based on the target notification manner includes:

by the encapsulated target notification manner invoking method, invoking the target interface so as to generate a corresponding notification message based on the target sending information and the target message template identifier, and send the notification message to the receiver corresponding to the target receiver information based on the target notification manner: where the target interface includes an interface provided by a service provider corresponding to the target notification manner and/or an interface of a server corresponding to the target notification manner.

In some embodiments, when the target notification manner invoking method is performed, the target interface is invoked by using relevant codes in the invoking method so as to, by the target interface, based on a template corresponding to the target template identifier, generate a notification message containing the target sender information, and based on the target notification manner, push the notification message to the receiver corresponding to the target receiver information. For example, the template corresponding to the target template identifier is a verification code template, and the target sender information includes the sender name and thus the generated notification message is verification code information containing the sender name.

In some embodiments, when the target notification manner invoking method is determined based on the target notification manner configuration information, the target notification manner invoking method corresponding to a target notification manner identifier and/or a target message template identifier is determined.

In some embodiments, when the target notification manner configuration information includes a target third-party service identifier, the target notification manner invoking method corresponding to the target third-party service identifier and the target notification manner identifier and/or the target message template identifier is determined. For example, when the target notification manner configuration information includes the target third-party service identifier and the target notification manner identifier, a notification manner invoking method, i.e. the target notification manner invoking method, corresponding to the target third-party service identifier and the target notification manner identifier is queried for such that based on the invoking method, an API interface of the third-party service corresponding to the third-party service identifier is invoked and then based on the API interface, a corresponding notification message is generated, and then based on the target notification manner, the notification message is pushed to the target receiver.

The notification manner invoking method may be determined by a middleware service (the notification sending service shown in FIG. 5). The middleware service, after obtaining the target rule identifier, determines the target notification manner configuration rule corresponding to the target rule identifier, extracts an identifier relating to determining the notification manner invoking method, such as the target notification manner identifier, the target message template identifier and the third-party service identifier, and routes out the notification manner invoking method corresponding to the identifier so as to obtain the target notification manner invoking method. Thus, based on the target notification manner invoking method, message push is performed to achieve successful message push, without requiring the development personnel of the B end to learn relevant notification manner invoking method, reducing the workload of the development personnel of the B end.

For example, in a specific application scenario, as shown in FIG. 5, when the service configuration rule is a notification manner configuration rule, the service encapsulation interface is a notification sending interface in the statistics configuring module in the backstage-exposed interface service, and is obtained by encapsulating the notification sending service. The notification sending service includes a data querying module, a json data parsing component and an invoking external integration api module. After the electronic device (e.g. the service end in the B end) obtains the target rule identifier, when the target rule identifier is a identifier corresponding to the notification manner configuration rule, the electronic device invokes the notification sending interface such that the target rule identifier is taken as input parameter of a query notification rule detail interface in the data querying module based on the notification sending interface so as to query for a rule configuration table, i.e. a notification manner configuration rule, corresponding to the target rule identifier in the database by using the query notification rule detail interface, where the notification manner configuration rule is in the format of json. The json data parsing component parses the notification manner configuration rule to obtain the notification manner configuration information, and the invoking external integration api module encapsulates the notification manner configuration information and takes the encapsulated notification manner configuration information as input parameter of the API interface (i.e. external API) of the third-party service, and then by the target notification manner, pushes the message to the user (i.e. target user end). For example, the encapsulated notification manner configuration information is that "receiver": "123456789", "template": "1", "sender": "123456789", where "receiver" is a receiving user, template is a message template identifier, template id, and sender is a sending user.

In this embodiment, when the demanding party needs to use the notification manner to push a message, the demanding party may directly input a corresponding to-be-processed service request such that the electronic device invokes a target notification manner invoking method based on a target rule identifier corresponding to the to-be-processed service request so as to achieve the purpose of using the target interface. Thus, without requiring development personnel (development personnel of the B end) to learn the use method of the target interface, the target interface can be directly used to push a message, shortening the development time length of the message push function, and increasing the multiplexing rate of the notification manner invoking method, i.e. the multiplexing rate of the codes.

In this embodiment, a corresponding database query statement is generated based on the database statement format and the target statistics configuration information, such that data statistics processing is performed based on the database query statement to achieve automatic generation of relevant service codes, without requiring development personnel (i.e. the development personnel of the B end) to write relevant database query codes. When a service requirement is changed, it is only required to modify the corresponding statistics configuration information, i.e. the data statistics rule, without modifying corresponding service codes, increasing the flexibility.

In this embodiment, after obtaining the rule identifier corresponding to the service configuration rule, the B end user may allocate the rule identifier to the user (e.g. the C end user), and the electronic device (i.e. the service end in the B end) invokes relevant interface based on the rule identifier input by the user to achieve corresponding service function. For example, when data statistics processing is performed, the obtained target statistics data is returned to the C end user, so as to perform relevant service processing without requiring the C end user to develop relevant service function. In this way, the development time of the service function of the development personnel of the B end is shortened and the workload of the development personnel of the B end is greatly reduced.

Corresponding to the above method embodiments, the present disclosure further provides an embodiment of an apparatus and a terminal to which the apparatus is applied.

Figure 7:
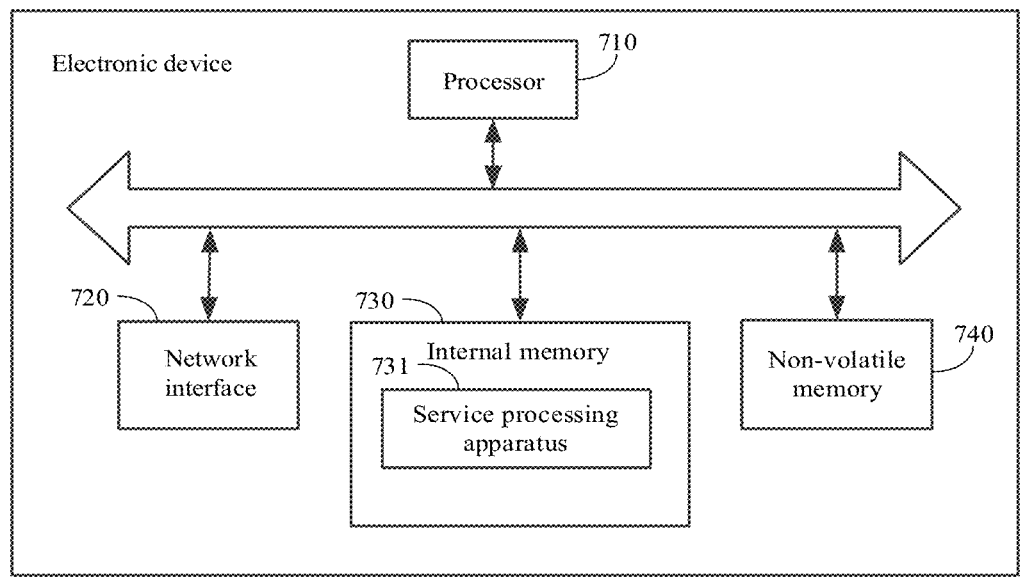
FIG. 7 is a hardware diagram illustrating an electronic device where a service processing apparatus is located according to an exemplary embodiment of the present disclosure.

The embodiment of the service processing apparatus of the present disclosure may be applied to an electronic device, for example, to a server or a terminal device. The apparatus embodiment may be implemented by software or by hardware or by combination of software and hardware. With software implementation as an example, the apparatus, logically, is formed by reading the corresponding computer program instructions in a non-volatile memory into an internal memory for running by a service processing processor. From hardware level, as shown in FIG. 7, it is a hardware structural diagram illustrating a computer device where the service processing apparatus is located according to an embodiment of the present disclosure. In addition to the processor 710, the internal memory 730, the network interface 720 and the non-volatile memory 740 shown in FIG. 7, the server or the terminal device where the service processing apparatus 731 is located in the embodiments may further include another hardware based on the actual function of the electronic device, which is not limited herein.

Figure 8:
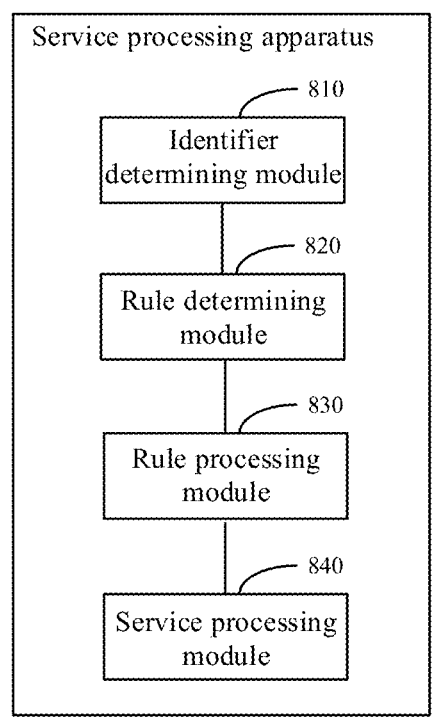
FIG. 8 is a block diagram illustrating a service processing apparatus according to an exemplary embodiment of the present disclosure.

FIG. 8 is a block diagram illustrating a service processing apparatus according to an embodiment of the present disclosure. The apparatus includes:

an identifier determining module 810, configured to obtain a to-be-processed service request and determine a target rule identifier corresponding to the to-be-processed service request;

a rule determining module 820, configured to determine a target service configuration rule corresponding to the target rule identifier;

a rule processing module 830, configured to obtain target configuration information by parsing the target service configuration rule; and a service processing module 840, configured to perform service processing based on the target configuration information.

In some embodiments, the rule determining module 820 is configured to:

determine a service encapsulation interface corresponding to the target rule identifier: where the service encapsulation interface indicates at least one service configuration rule; and invoke the service encapsulation interface, and based on the at least one service configuration rule indicated by the service encapsulation interface, determine the target service configuration rule corresponding to the target rule identifier.

In some embodiments, the service processing module 840 is configured to:

determine target service codes based on the target configuration information, and perform corresponding service processing based on the target service codes.

In some embodiments, the service processing module 840 is further configured to:

by configuring preset code information based on the target configuration information, obtain the target service codes.

In some embodiments, the target service configuration rule includes a data statistics rule: the target configuration information includes target statistics configuration information; and the code information includes a database statement format.

The service processing module 840 is further configured to:

based on the database statement format and the target statistics configuration information, generate a database query statement.

Performing corresponding service processing based on the target service codes includes:

executing the database query statement to perform corresponding data statistics processing so as to obtain target statistics data.

In some embodiments, the target statistics configuration information includes one or more of a target database identifier, a target datasheet identifier, a target to-be-calculated field name or a target query condition.

The service processing module 840 is further configured to:

by splicing one or more of the target database identifier, the target datasheet identifier, the target to-be-calculated field name or the target query condition based on the database statement format, generate the database query statement.

In some embodiments, the service processing module 840 is further configured to:

execute the database query statement to query for a field value corresponding to a target to-be-calculated field based on a target query condition in the database query statement to obtain the target statistics data corresponding to a target data statistics rule; where the target to-be-calculated field is a field in a datasheet corresponding to a target datasheet identifier in a database corresponding to a target database identifier.

In some embodiments, the service processing module 840 is further configured to:

obtain database connection information corresponding to the target database identifier; and based on the database connection information corresponding to the target database identifier, connect a database corresponding to the target database identifier.

In some embodiments, the service processing module 840 is further configured to:

send the target statistics data to a target user end such that the target user end displays the target statistics data.

In some embodiments, the target service configuration rule includes a notification manner configuration rule: the target configuration information includes target notification manner configuration information; and the code information includes a notification manner invoking method.

The service processing module 840 is further configured to:

determine a target notification manner invoking method corresponding to the target notification manner configuration information; and obtain an encapsulated target notification manner invoking method by encapsulating the target notification manner configuration information to the target notification manner invoking method.

Correspondingly, the service processing module 840 is further configured to:

invoke the encapsulated target notification manner invoking method so as to generate and send a notification message to a receiver based on a target notification manner.

In some embodiments, the target notification manner invoking method indicates codes for invoking a target interface corresponding to the target notification manner to generate and send the notification message.

The target notification manner configuration information includes target sending information, where the target sending information includes target receiver information.

The service processing module 840 is further configured to:

by the encapsulated target notification manner invoking method, invoke the target interface so as to generate a corresponding notification message based on the target sending information, and send the notification message to the receiver corresponding to the target receiver information based on the target notification manner; where the target interface includes an interface provided by a service provider corresponding to the target notification manner and/or an interface of a server corresponding to the target notification manner.

In some embodiments, the target sending information further includes target sender information: where the target sender information includes one or more of a sender name, a sender email, a sender password or a sender number.

The target notification manner includes one or more of an email notification manner, a short message notification manner, or a specified application notification manner.

In some embodiments, the target notification manner configuration information includes a target notification manner identifier and/or a target message template identifier.

The service processing module 840 is further configured to:

determine the target notification manner invoking method corresponding to the target notification manner identifier and/or the target message template identifier.

In some embodiments, a first page is provided by an electronic device; and the first page includes a rule configuration control and a configuration completion control.

The service processing apparatus further includes a rule configuring module.

The rule configuring module is configured to:

in response to a first trigger operation for the configuration completion control, obtain configuration information corresponding to the rule configuration control; and based on the configuration information corresponding to the rule configuration control, generate a service configuration rule and a rule identifier corresponding to the service configuration rule.

In some embodiments, the present disclosure further provides an electronic device, including a processor, and a memory storing processor executable instructions, where the processor is configured to:

obtain a to-be-processed service request and determine a target rule identifier corresponding to the to-be-processed service request;

determine a target service configuration rule corresponding to the target rule identifier;

obtain target configuration information by parsing the target service configuration rule; and perform service processing based on the target configuration information.

Details of the implementation process of the functions and effects of different modules in the above-described apparatus may be referred to the implementation process of corresponding steps in the above-described method and will not be redundantly described herein.

In an embodiment of the present disclosure, there is provided a computer readable storage medium, storing computer executable instructions, where the computer executable instructions are executed by a processor to perform the above service processing method.

In an embodiment of the present disclosure, there is provided a computer program product, including a computer program, where the computer program is executed by a processor to perform the above service processing method.

Since the apparatus embodiments substantially correspond to the method embodiments, a reference may be made to part of the descriptions of the method embodiments for the related part. The apparatus embodiments described above are merely illustrative, where the modules described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

The specific embodiments of the present disclosure are described as above. Other embodiments may also be obtained within the scope of the appended claims. In some cases, the actions or steps recorded in the claims may be performed in a sequence different from the embodiments to achieve the desired result. Further, the processes shown in drawings do not necessarily require a particular sequence or a continuous sequence to achieve the desired result. In some embodiments, a multi-task processing and parallel processing is possible and may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The foregoing disclosure is merely illustrative of preferred embodiments of the present disclosure but not intended to limit the present disclosure, and any modifications, equivalent substitutions, improvements thereof made within the spirit and principles of the disclosure shall be encompassed in the scope of protection of the present disclosure.

The invention claimed is:

1. A service processing method, comprising:
obtaining a to-be-processed service request and determining a target rule identifier corresponding to the to-be-processed service request;
determining a target service configuration rule corresponding to the target rule identifier;
obtaining target configuration information by parsing the target service configuration rule; and
performing service processing based on the target configuration information;
wherein determining the target service configuration rule corresponding to the target rule identifier comprises:
determining a service encapsulation interface corresponding to the target rule identifier; wherein the service encapsulation interface indicates at least one service configuration rule; and
invoking the service encapsulation interface, and based on the at least one service configuration rule indicated by the service encapsulation interface, determining the target service configuration rule corresponding to the target rule identifier;
wherein performing the service processing based on the target configuration information comprises:
by configuring preset code information based on the target configuration information, obtaining target service codes, wherein the code information comprises a database statement format and/or a notification manner invoking method; and
performing corresponding service processing based on the target service codes;
wherein the target service configuration rule comprises a data statistics rule; the target configuration information comprises target statistics configuration information; and the code information comprises a database statement format;
by configuring the preset code information based on the target configuration information, obtaining the target service codes comprises:
based on the database statement format and the target statistics configuration information, generating a database query statement; and
performing corresponding service processing based on the target service codes comprises:
executing the database query statement to perform corresponding data statistics processing so as to obtain target statistics data;
wherein the target statistics configuration information comprises one or more of a target database identifier, a target datasheet identifier, a target to-be-calculated field name or a target query condition;
based on the database statement format and the target statistics configuration information, generating the database query statement comprises:
by splicing one or more of the target database identifier, the target datasheet identifier, the target to-be-calculated field name or the target query condition based on the database statement format, generating the database query statement.

2. The method of claim 1, wherein executing the database query statement to perform corresponding data statistics processing so as to obtain the target statistics data comprises:
executing the database query statement to query for a field value corresponding to a target to-be-calculated field based on a target query condition in the database query statement to obtain the target statistics data corresponding to a target data statistics rule; wherein the target to-be-calculated field is a field in a datasheet corresponding to a target datasheet identifier in a database corresponding to a target database identifier.

3. The method of claim 1, further comprising:
obtaining database connection information corresponding to the target database identifier; and
based on the database connection information corresponding to the target database identifier, connecting a database corresponding to the target database identifier.

4. The method of claim 1, further comprising:
sending the target statistics data to a target user end such that the target user end displays the target statistics data.

5. The method of claim 1, wherein the target service configuration rule comprises a notification manner configuration rule; the target configuration information comprises target notification manner configuration information; and the code information comprises a notification manner invoking method;
by configuring the preset code information based on the target configuration information, obtaining the target service codes comprises:
determining a target notification manner invoking method corresponding to the target notification manner configuration information; and
obtaining an encapsulated target notification manner invoking method by encapsulating the target notification manner configuration information to the target notification manner invoking method;
performing corresponding service processing based on the target service codes comprises:

invoking the encapsulated target notification manner invoking method so as to generate and send a notification message to a receiver based on a target notification manner.

6. The method of claim 5, wherein the target notification manner invoking method indicates codes for invoking a target interface corresponding to the target notification manner to generate and send the notification message;

the target notification manner configuration information comprises target sending information, wherein the target sending information comprises target receiver information;

invoking the encapsulated target notification manner invoking method so as to generate and send the notification message to the receiver based on the target notification manner comprises:

by the encapsulated target notification manner invoking method, invoking the target interface so as to generate a corresponding notification message based on the target sending information, and send the notification message to the receiver corresponding to the target receiver information based on the target notification manner; wherein the target interface comprises an interface provided by a service provider corresponding to the target notification manner and/or an interface of a server corresponding to the target notification manner.

7. The method of claim 6, wherein the target sending information further comprises target sender information; wherein the target sender information comprises one or more of a sender name, a sender email, a sender password or a sender number;

the target notification manner comprises one or more of an email notification manner, a short message notification manner, or a specified application notification manner.

8. The method of claim 5, wherein the target notification manner configuration information comprises a target notification manner identifier and/or a target message template identifier;

determining the target notification manner invoking method corresponding to the target notification manner configuration information comprises:

determining the target notification manner invoking method corresponding to the target notification manner identifier and/or the target message template identifier.

9. The method of claim 1, wherein a first page is provided by an electronic device; and the first page comprises a rule configuration control and a configuration completion control;

the method further comprises:

in response to a first trigger operation for the configuration completion control, obtaining configuration information corresponding to the rule configuration control; and based on the configuration information corresponding to the rule configuration control, generating a service configuration rule and a rule identifier corresponding to the service configuration rule.

10. A non-transitory computer readable storage medium, storing a computer executable instruction, wherein the computer executable instruction is executed by a processor to perform the service processing method of claim 1.

11. An electronic device, comprising a memory, a processor and a computer program stored in the memory and run on the processor, wherein the processor executes the computer program to perform the steps of:

obtaining a to-be-processed service request and determining a target rule identifier corresponding to the to-be-processed service request;

determining a target service configuration rule corresponding to the target rule identifier;

obtaining target configuration information by parsing the target service configuration rule; and performing service processing based on the target configuration information;

wherein determining the target service configuration rule corresponding to the target rule identifier comprises:

determining a service encapsulation interface corresponding to the target rule identifier;

wherein the service encapsulation interface indicates at least one service configuration rule; and invoking the service encapsulation interface, and based on the at least one service configuration rule indicated by the service encapsulation interface, determining the target service configuration rule corresponding to the target rule identifier;

wherein performing the service processing based on the target configuration information comprises:

by configuring preset code information based on the target configuration information, obtaining target service codes, wherein the code information comprises a database statement format and/or a notification manner invoking method; and performing corresponding service processing based on the target service codes;

wherein the target service configuration rule comprises a data statistics rule; the target configuration information comprises target statistics configuration information; and the code information comprises a database statement format;

by configuring the preset code information based on the target configuration information, obtaining the target service codes comprises:

based on the database statement format and the target statistics configuration information, generating a database query statement; and performing corresponding service processing based on the target service codes comprises:

executing the database query statement to perform corresponding data statistics processing so as to obtain target statistics data;

wherein the target statistics configuration information comprises one or more of a target database identifier, a target datasheet identifier, a target to-be-calculated field name or a target query condition;

based on the database statement format and the target statistics configuration information, generating the database query statement comprises:

by splicing one or more of the target database identifier, the target datasheet identifier, the target to-be-calculated field name or the target query condition based on the database statement format, generating the database query statement.

12. The electronic device of claim 11, wherein determining the target service configuration rule corresponding to the target rule identifier comprises:

determining a service encapsulation interface corresponding to the target rule identifier; wherein the service encapsulation interface indicates at least one service configuration rule; and invoking the service encapsulation interface, and based on the at least one service configuration rule indicated by the service encapsulation interface, determining the target service configuration rule corresponding to the target rule identifier.

13. The electronic device of claim 11, wherein performing the service processing based on the target configuration information comprises:
   determining target service codes based on the target configuration information, and
   performing corresponding service processing based on the target service codes.

14. The electronic device of claim 13, wherein determining the target service codes based on the target configuration information comprises:
   by configuring preset code information based on the target configuration information, obtaining the target service codes.

* * * * *